United States Patent
Faigle et al.

[19]

[11] Patent Number: 5,813,692
[45] Date of Patent: Sep. 29, 1998

[54] AIR BAG MODULE

[75] Inventors: Ernst M. Faigle, Dryden; Tracy S. Sparks, Lapeer; Xingyuan Sun, Rochester Hills, all of Mich.

[73] Assignee: TRW Vehicle Safety Systems Inc., Lyndhurst, Ohio

[21] Appl. No.: 755,286

[22] Filed: Nov. 22, 1996

[51] Int. Cl.$^6$ ................................................ B60R 21/16
[52] U.S. Cl. .................. 280/728.2; 280/732; 280/728.1
[58] Field of Search ................................ 280/728.2, 731, 280/732, 728.1, 743.1

[56] References Cited

U.S. PATENT DOCUMENTS

| | | | |
|---|---|---|---|
| 4,793,631 | 12/1988 | Takada | 280/743.1 |
| 4,943,027 | 7/1990 | Nakayama | 248/548 |
| 5,209,510 | 5/1993 | Mamiya | 280/728.2 |
| 5,295,707 | 3/1994 | Satoh et al. | 380/728.1 |
| 5,383,682 | 1/1995 | Nagata et al. | 280/777 |
| 5,503,427 | 4/1996 | Ravenberg et al. | 280/728.3 |
| 5,516,145 | 5/1996 | Williams et al. | 280/732 |
| 5,527,064 | 6/1996 | Kai et al. | 280/728.2 |
| 5,533,747 | 7/1996 | Rose | 280/728.2 |
| 5,542,693 | 8/1996 | Koide | 280/728.2 |
| 5,597,177 | 1/1997 | Matsuura | 280/731 |
| 5,607,179 | 3/1997 | Lenart et al. | 280/728.2 |

OTHER PUBLICATIONS

3M Corp., article entitled "Engineered Foam Products", pp. 1–11, Oct., 1994.

*Primary Examiner*—Christopher P. Ellis
*Attorney, Agent, or Firm*—Tarolli, Sundheim, Covell, Tummino & Szabo

[57] ABSTRACT

An air bag module (10) includes a container (12) and an air bag (16) connected with the container. An inflator (14) is also connected with the container (12). Means, such as, mounting flanges (42, 46), support the container (12) on a vehicle portion (18) for movement relative to the vehicle portion in a first direction ("I") opposite the direction of the inflation of the air bag (16) in response to actuation of the inflator (14). Damping means (102) connected between the container (12) and the vehicle portion (18) damps movement of the container in the first direction ("I") relative to the vehicle portion.

21 Claims, 5 Drawing Sheets

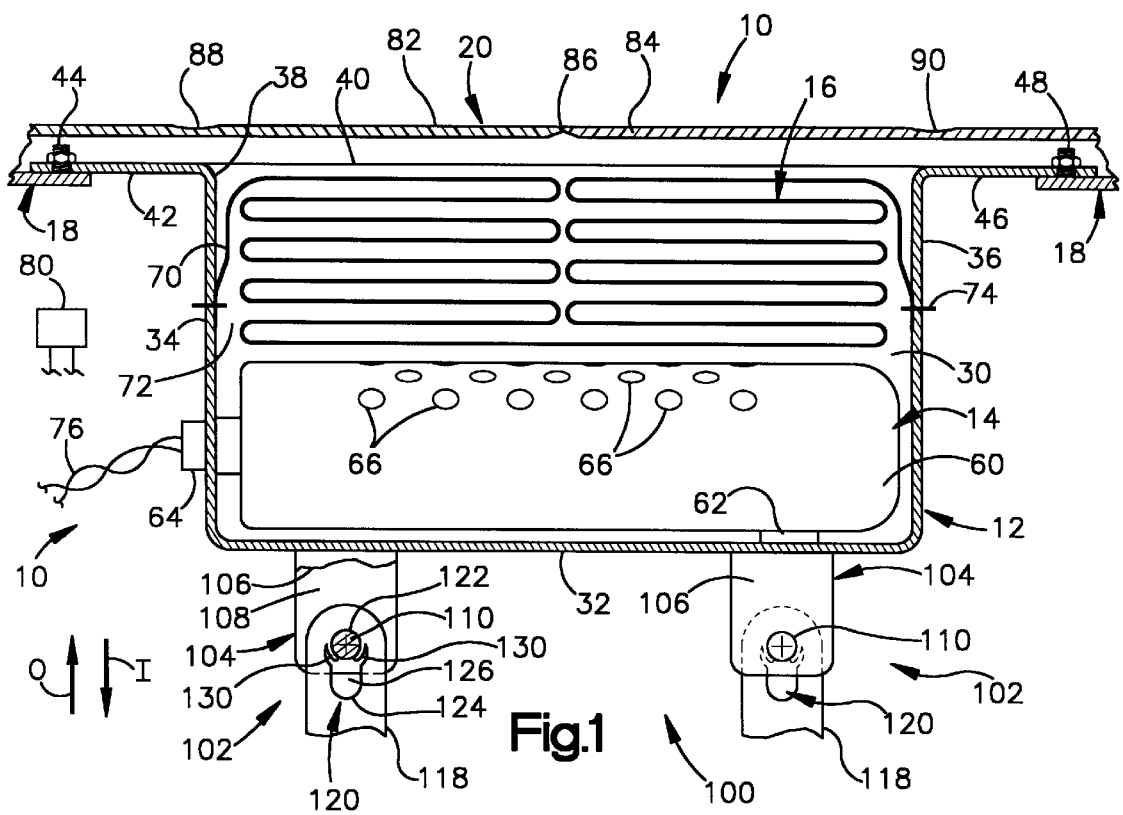
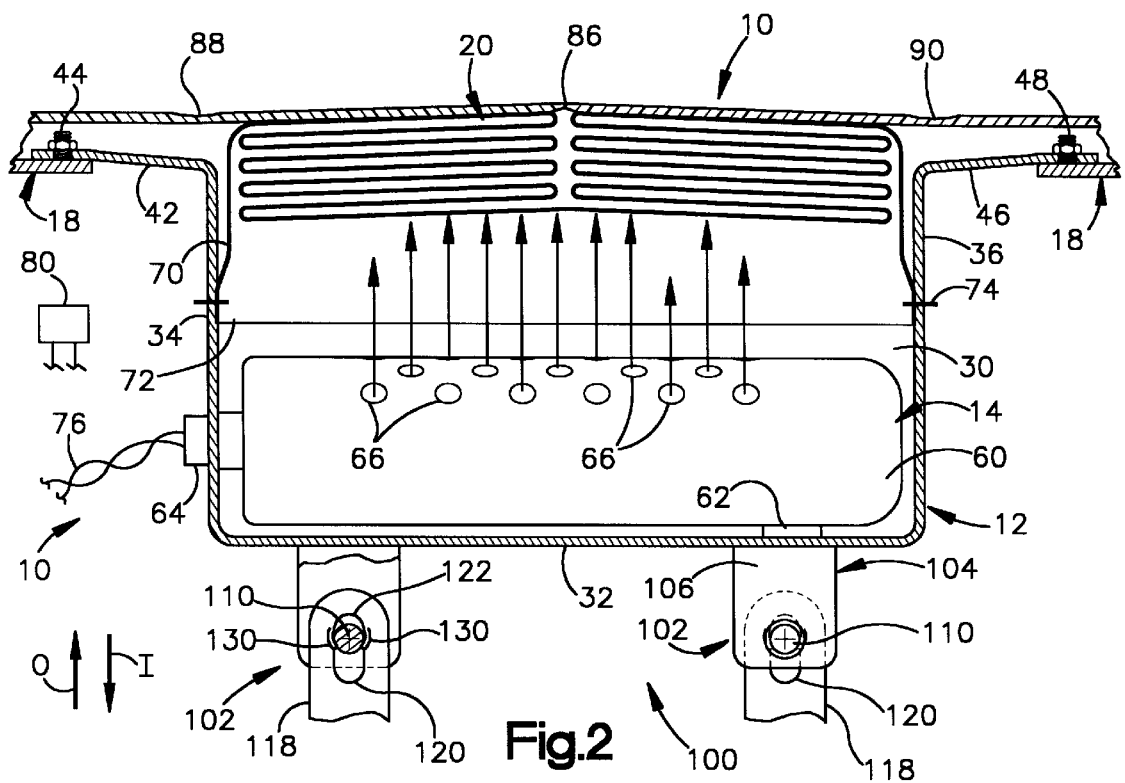

AIR BAG MODULE

BACKGROUND OF THE INVENTION

1. Technical Field

The present invention relates to a vehicle safety apparatus and, in particular, relates to an air bag module including an inflatable vehicle occupant protection device, such as an air bag, for helping to protect a vehicle occupant.

2. Description of the Prior Art

It is known to inflate an air bag to help protect a vehicle occupant in the event of an impact to a vehicle of a magnitude above a predetermined threshold. The air bag is stored in a deflated condition, together with an inflator, in a portion of the vehicle such as the instrument panel or steering wheel of the vehicle. In the event of an impact to the vehicle of a magnitude above a predetermined threshold, the inflator is actuated, and the air bag is inflated into a position adjacent to the vehicle occupant. The air bag helps protect the vehicle occupant from forcefully striking the instrument panel or steering wheel of the vehicle.

The inflator and the air bag are commonly housed in a container fixed to the instrument panel or steering wheel of the vehicle. When the inflator is actuated, a large amount of force can be rapidly transmitted into the container. Any excess force should be dissipated in a manner so as to avoid damage to the container or to the instrument panel or steering wheel of the vehicle or injury to the vehicle occupant.

SUMMARY OF THE INVENTION

The present invention is an apparatus for helping to protect an occupant of a vehicle. The apparatus comprises a container and an inflatable vehicle occupant protection device connected with the container for helping to protect the occupant of the vehicle. An inflator is connected with the container for, upon actuation, providing inflation fluid to inflate the inflatable device. The container is supported on a portion of the vehicle for movement in a first direction relative to the vehicle portion in response to actuation of the inflator. Damping means is connected between the container and the vehicle portion for damping movement of the container in the first direction relative to the vehicle portion.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a side view, partially in section, of an air bag module constructed in accordance with the present invention, showing the air bag in a deflated condition;

FIG. 2 is a view similar to FIG. 1 showing the air bag in a first partially inflated condition;

DESCRIPTION OF THE PREFERRED EMBODIMENTS OF THE INVENTION

Figure 3:
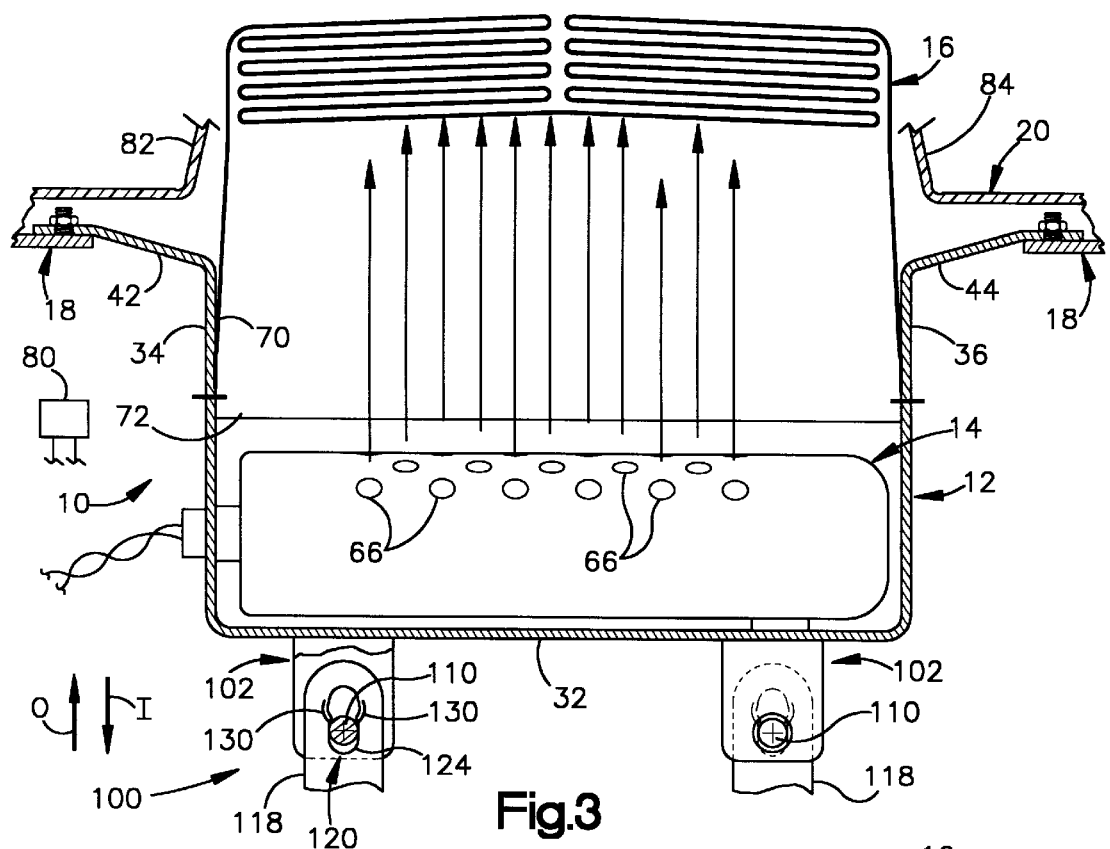
FIG. 3 is a view similar to FIG. 1 showing the air bag in a second partially inflated condition.

The present invention relates to a vehicle safety apparatus and, in particular, relates to a module including an inflatable vehicle occupant protection device, such as an air bag, for helping to protect a vehicle occupant. The present invention is applicable to various vehicle safety apparatus constructions. As representative of the present invention, FIGS. 1–4 illustrate a vehicle safety apparatus or air bag module 10.

The air bag module 10 includes a reaction canister or container 12, an inflator 14, and an inflatable vehicle occupant protection device or air bag 16. The container 12 is secured to a portion of a vehicle such as an instrument panel illustrated schematically at 18. The container 12 could, alternatively, be secured to another portion of the vehicle, such as the steering wheel, seat, or door. The air bag module 10 also includes a deployment door 20.

The container 12 (FIG. 1) is made from sheet metal and defines a chamber 30 in the container. The container 12 includes a back wall 32 which extends between and interconnects first and second end walls 34 and 36. The end walls 34 and 36 may be parts of a single wall which extends around the chamber 30. An outer edge portion 38 of the container 12 defines a deployment opening 40 in the container opposite the back wall 32.

The container 12 includes a first mounting flange 42 which extends outward from the first end wall 34 of the container. A fastener at 44 secures the first mounting flange 42 to the vehicle instrument panel 18. The container 12 includes a second mounting flange 46 which extends outward from the second end wall 36 of the container. A fastener 48 secures the second mounting flange 46 to the vehicle instrument panel 18. The first and second mounting flanges 42 and 46 may be parts of a single mounting flange which extends at least partially around the deployment opening 40 in the container 12. Typically, the container and the mounting flanges are formed as one piece from sheet metal such as sheet steel.

The mounting flanges 42 and 46 form means for supporting the container 12 on the instrument panel 18. The container 12 may be supported on the instrument panel 18 by other suitable means, such as one or more support plates connected between the container and the instrument panel. The support means holds the container 12 in position on the instrument panel 18 while permitting the container to move in the manner described below.

The mounting flanges 42 and 46 of the container 12 are constructed to enable relative movement to occur between the container 12 and the instrument panel 18, in an inward or first direction as indicated by the arrow "I", and in an opposite outward or second direction as indicated by the arrow "O". The characteristics of the container 12 are selected so that the mounting flanges 42 and 46 deform or bend by a predetermined amount when subjected to a load having a magnitude which exceeds a predetermined amount. These characteristics include the material from which the container 12 is made, and the thickness of the mounting flanges 42 and 46. In the preferred embodiment, the mounting flanges 42 and 46 are constructed so that the container 12 moves about 5 millimeters in the inward direction "I" upon actuation of the inflator 14.

The inflator 14 is illustrated as a pyrotechnic inflator which uses the combustion of gas-generating material to generate inflation fluid in the form of gas to inflate the air bag 16. The air bag module 10 alternatively could include an inflator which contains a stored quantity of pressurized inflation fluid, or a combination of pressurized inflation fluid and ignitable material for heating the inflation fluid.

A first end portion 60 of the inflator 14 is secured by a bracket or other means, indicated schematically at 62, to the back wall 32 of the container 12. A second end portion 64 of the inflator 14 extends through the first end wall 34 of the container 14 and connects the inflator with the first end wall of the container. The inflator 14 has one or more fluid outlets 66 disposed inside the container 12 for directing inflation fluid into the chamber 30 upon actuation of the inflator. The inflator 14 is oriented in the container 12 so that the fluid outlets 66 are presented generally toward the deployment opening 40 in the container and away from the back wall 32 of the container.

The air bag 16 is preferably made from a fabric material such as woven nylon. The air bag 16 can alternatively be made from non-woven material, such as plastic film. The use of plastic film, in particular, would require inflation fluid vents to be formed in the air bag 16, as is known in the art. The air bag 16 has a throat portion 70 which defines an inflation fluid opening 72 in the air bag. The air bag module 10 includes known fastener means indicated schematically at 74, such as rivets, for securing the throat portion 70 of the air bag 16 to the container 12.

A pair of lead wires 76 extend from the second end portion 64 of the inflator 14. The lead wires 76 are connected with known actuation means indicated schematically at 80 (FIG. 1) for sensing a collision involving the vehicle and for actuating the inflator 14 in response to the sensing of a collision. The actuation means 80 may include a deceleration sensor and vehicle electric circuitry for actuating the inflator 14 in response to sensing a vehicle deceleration indicative of a vehicle collision having a severity greater than a predetermined threshold value.

The deployment door 20 is secured to the instrument panel 18. The deployment door 20 extends across and closes the deployment opening 40 in the container 12. The deployment door 20 includes two panel portions 82 and 84 separated by a weakened portion 86 which is designed to rupture or break open upon inflation of the air bag 16. The deployment door 20 also has a pair of hinge portions 88 and 90 about which the panels portions 82 and 84 can pivot upon inflation of the air bag 16.

The air bag module 10 includes a damping mechanism or control mechanism 100 for controlling movement of the container 12, relative to the instrument panel 18, in the inward direction "I". The damping mechanism 100 in the embodiment illustrated in FIGS. 1–4 includes a pair of guide assemblies 102.

Each guide assembly 102 includes a tab 104 which extends from and is fixed for movement with the back wall 32 of the container 12. The tab 104 may be formed as one piece with the container 12. The tab 104, in the illustrated embodiment, includes parallel, spaced walls 106 and 108. Each guide assembly 102 also includes a first guide member 110 in the form of a pin or rivet which extends between and interconnects the walls 106 and 108 of the tab 104. The pin 110 is fixed for movement with the tab 104 and, thereby, with the back wall 32 of the container 32.

Each guide assembly 102 also includes a second guide member 118. The second guide member 118 has a planar configuration extending between the walls 106 and 108 of the tab 104. The second guide member 118 is connected with the instrument panel 18 so that the second guide member does not move relative to the instrument panel during deployment of the air bag 16.

The second guide member 118 includes a slot 120 having a first end portion 122 which is disposed closest to the back wall 32 of the container 12. The slot 120 has a second end portion 124, opposite the first end portion, which is disposed farthest from the back wall 32 of the container 12. An intermediate portion 126 of the slot 120 extends between and interconnects the first end portion 122 and the second end portion 124. The slot 120 has a nominal width (from left to right as viewed in FIGS. 1–4) which is slightly greater than the diameter of the pin 110.

The second guide member 118 includes a pair of ears 130 disposed on opposite sides of the slot 120. The ears 130 project toward each other into the slot 120. The distance between the ears 130 is less than the diameter of the pin 110. The ears 130 are located at a position along the length of the slot 120 so that, when the pin 110 is in the first end portion 122 of the slot, the ears resist movement of the pin out of the first end portion of the slot.

Under normal usage conditions of the vehicle in which the air bag module 10 is mounted, the ears 130 retain the pin 110 in position relative to the second guide member 118, and the pin does not move in the slot 120. The ears 130 thus block movement of the back wall 32 of the container 12, relative to the instrument panel 18, unless a force having a magnitude in excess of a predetermined amount is applied to the back wall of the container to move the container and the pin 110 in the inward direction "I". The predetermined amount of force is selected to be indicative of a force level on the container 12 which might, if uncontrolled, put an excessive amount of energy into the instrument panel 18. This force level is typically experienced only as a result of actuation of the inflator 14.

In the event of an impact to the vehicle of a magnitude greater than the predetermined threshold value, the actuation means 80 provides an electrical signal over the lead wires 76 to the inflator 14. The inflator 14 is actuated in a known manner and emits a large volume of inflation fluid under pressure. The inflation fluid is directed by the fluid outlets 66 in the inflator 14 into the chamber 30 in the container 12.

The inflation fluid from the inflator 14 flows primarily in the outward direction "O". This direction of flow of the inflation fluid is opposite to, or away from, the back wall 32 of the container 12. The outward flow of inflation fluid from the inflator 14 creates an equal and opposite reaction force on the inflator. The reaction force tends to urge the inflator 14 to move in the inward direction indicated by the arrow "I" in FIGS. 1 and 2.

Because the inflator 14 is fixed to the container 12, the reaction force is transmitted through the body of the inflator into the back wall 32 of the container. The reaction force tends to urge the back wall 32 of the container 12 to move in the inward direction "I" relative to the instrument panel 18.

The reaction of the force on the back wall 32 of the container 12 is transmitted through the tabs 104 into the pins 110. The force on the pins 110 quickly exceeds the resistance to deformation of the ears 130. The pins 110 move in the slots 120 in a direction toward the second end portion 124 of the slot. At the same time, the flexibility of the mounting flanges 42 and 46 of the container 12 enables a desired amount of relative movement to occur between the container and the instrument panel 18. The container 12 moves inward relative to the instrument panel 18 from the position shown in FIG. 1 through the position shown in FIG. 2 and to the position shown in FIG. 3.

FIG. 2 illustrates the position of the parts of the module 10 at a time of about 7 milliseconds after actuation of the inflator 14. The air bag 16 is inflating outward against the deployment door 20. The reaction force resulting from the outwardly flowing inflation fluid has caused a small amount of relative movement between the container 12 and the instrument panel 18. The mounting flanges 42 and 46 of the container 12 are flexed slightly. The force of the inwardly moving container 12, transmitted through the back wall 32 of the container into the pins 110, has overcome the initial resistance of the ears 130. The ears 130 are deforming and the pins 110 are moving along the slots 120.

FIG. 3 illustrates the position of the parts of the module 10 at a time of about 20 milliseconds after actuation of the inflator 14. The inflator 14 and the container 12 have moved in the inward direction "I" to a substantially inward position. The mounting flanges 42 and 46 of the container 12 are flexed by a substantial amount. The pins 110 have moved past the ears 130 on the second guide members 118, deforming or bending the ears outward. The pins 110 are disposed at or near the second end portions 124 of the slots 120.

During the movement of the container 12 from the position shown in FIG. 1 to the position shown in FIG. 3, a small portion of the energy of the inwardly-moving container is dissipated in the flexing of the mounting flanges 42 and 46. A large portion of the energy in the container 12 is dissipated in the control mechanism 100. Specifically, the force which is required to deform the ears 130 of the guide assemblies 102 is no longer present in the container 12 in the form of kinetic or potential energy. Preferably, the deformation of the ears 130 removes substantially all the kinetic energy of the container 12, so that the container moves only very slowly, or not at all, after the pin 110 passes the ears in the slot 120.

About 20 milliseconds after actuation of the inflator 14, the air bag 16 (FIG. 3) has inflated outward through the deployment door 20. An outwardly-directed force is exerted on the container 12. This force begins to exceed the inwardly-directed reaction force caused by flow of inflation fluid from the inflator 14. The container 12 thereafter starts to move outward, from the position shown in FIG. 3 to the position shown in FIG. 4.

Figure 4:
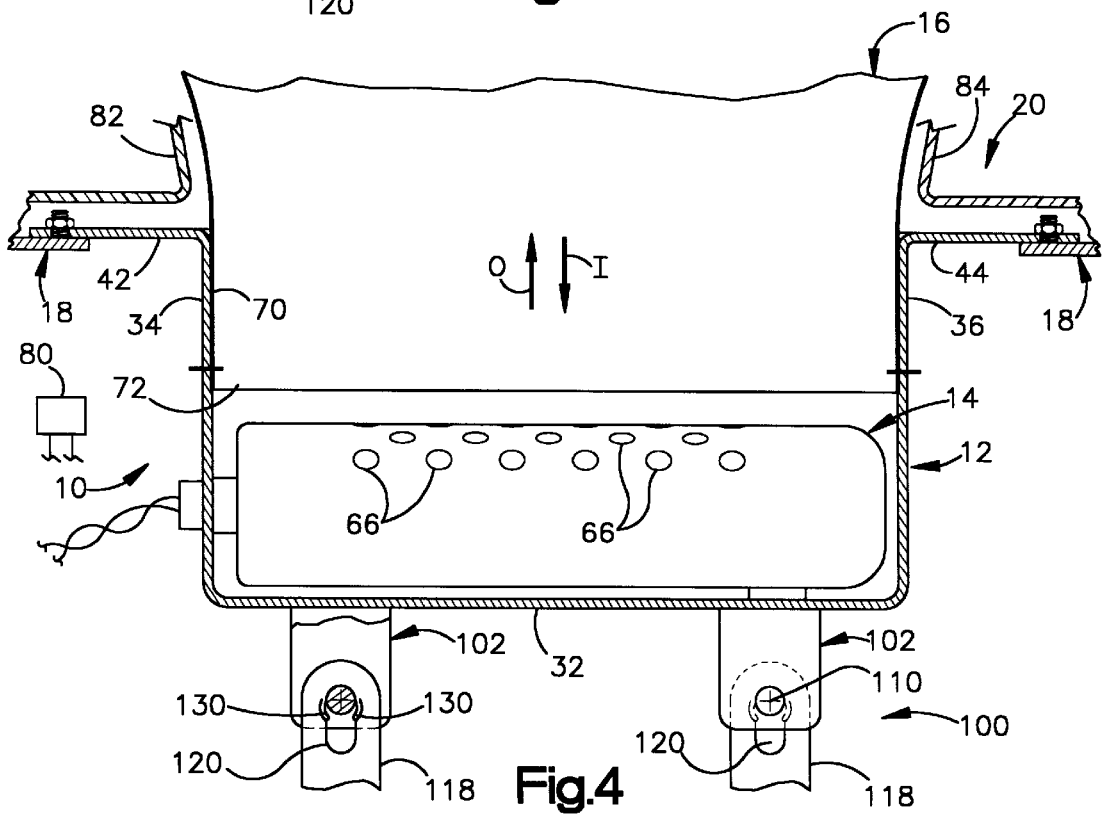
FIG. 4 is a view similar to FIG. 1 showing the air bag in a third, inflated condition.

FIG. 4 illustrates the position of the parts of the apparatus 10 about 60 milliseconds after actuation of the inflator 14. The container 12 has moved outward, from the position shown in FIG. 3 to the position shown in FIG. 4, under the force of the outwardly-moving air bag 16. The pins 110 have moved outward past the ears 130 on the second guide members 118, to a position near the first end portions 122 of the slots 120. The kinetic energy of the outwardly-moving container 12 is relatively small compared to the energy of the initial reaction force. Thus, the kinetic energy of the outwardly-moving container 12 need not be dissipated in any manner other than through the flexing of the mounting flanges 42 and 46. If desired, however, the second guide members 118 can be configured so that the outward movement of the pins 110 in the slots 120 is resisted, thereby slowing outward movement of the container 12 and dissipating energy. This resistance may occur, for example, if the elasticity of the material of the guide member 118 causes the ears 130 to move toward each other after the pin 110 passes by the ears.

Figure 5:
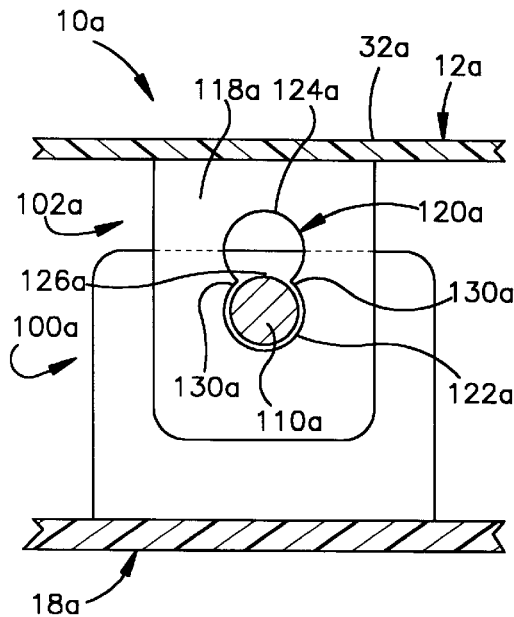
FIG. 5 is a view similar to FIG. 1 showing an air bag module constructed in accordance with a second embodiment of the present invention.
Figure 6:
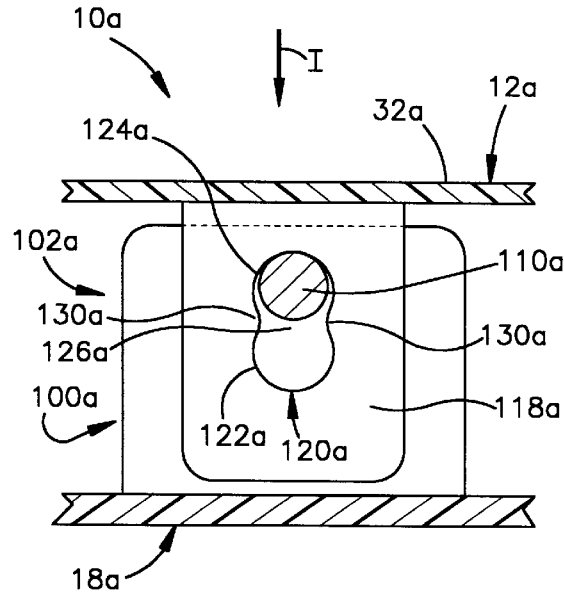
FIG. 6 is a view of the air bag module of FIG. 5 showing the air bag in a first, partially inflated condition.

FIGS. 5 and 6 illustrate portions of an air bag module 10a which is constructed in accordance with a second embodiment of the present invention. The air bag module 10a is generally similar to the air bag module 10 (FIGS. 1–4). Parts of the module 10a which are the same as or similar to corresponding parts of the module 10 are given the same reference numerals with the suffix "a" added for clarity. Parts of the module 10a which are not shown in FIGS. 5 and 6 are the same as corresponding parts of the module 10.

The air bag module 10a (FIG. 5) includes a damping mechanism or control mechanism 100a for controlling movement of the container 12a, relative to the instrument panel 18a, in an inward or first direction "I". The damping mechanism 100a includes one or more guide assemblies 102a. In each guide assembly 102a, a pin or other type of guide member 110a is fixed in position relative to the instrument panel 18a.

A guide member 118a is fixed for movement with the container 12a. The pin 110a extends through a slot 120a in the guide member 118a. The slot 120a has a "figure eight" configuration including first and second end portions 122a and 124a. The guide member 118a has spaced apart wall portions 130a which define a narrow neck portion 126a of the slot 120a intermediate the end portions 122a and 124a of the slot.

FIG. 5 illustrates the parts of the module 10a in an initial condition similar to that of the module 10 shown in FIG. 1. The pin 110a (FIG. 5) is in the first end portion 122a of the slot 120a. The wall portions 130a of the guide member 118a hold the pin 110a in the first end portion 122a of the slot 120a until actuation of the inflator (not shown) of the module 10a. Upon actuation of the inflator, the reaction force on the container 12a causes the slotted guide member 118a to move in the inward direction "I" relative to the fixed pin 110a.

The reaction force exerted on the guide member 118a causes the narrow neck portion 126a of the slot 120a to move past the pin 110a. As this movement occurs, the wall portions 130a of the guide member 118a on either side of the slot 120a deform, absorbing energy and slowing the movement of the pin 110a and, thus, of the container 12a. The guide assembly 100a thus controls or damps the inward movement of the container 12a. The pin 110a is located in the second end portion 124a of the slot 120a upon the cessation of movement of the container 12a in the inward direction "I".

Figure 7:
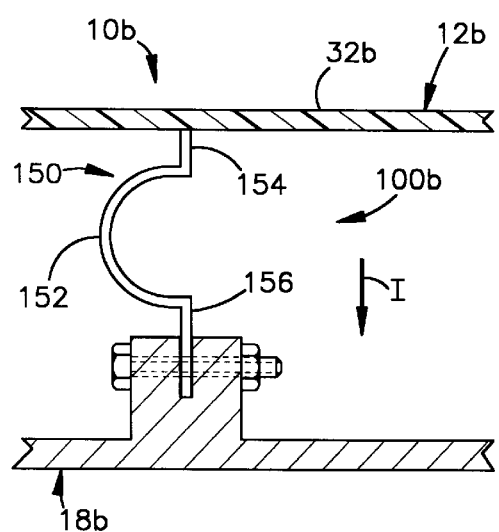
FIG. 7 is a view of a portion of an air bag module constructed in accordance with a third embodiment of the present invention, shown in a first condition.
Figure 8:
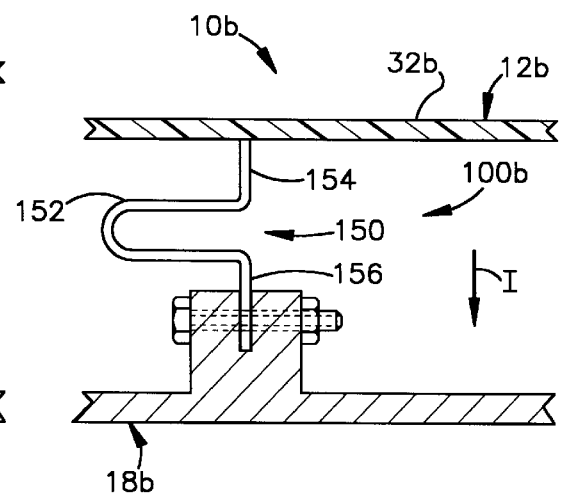
FIG. 8 is a view of the air bag module of FIG. 7 shown in a second condition.

FIGS. 7 and 8 illustrate a portion of an air bag module 10b which is constructed in accordance with a third embodiment of the present invention. The air bag module 10b is similar to the air bag module 10 (FIGS. 1–4). Parts of the module 10b which are the same as or similar to corresponding parts of the module 10 are given the same reference numerals with the suffix "b" added for clarity. Parts of the module 10b which are not shown in FIGS. 7 and 8 are the same as the corresponding parts of the module 10.

The damping mechanism or control mechanism 100b (FIG. 7) includes a deformable guide member 150 which may be formed as one piece with the back wall 32b of the container 12b. The guide member 150 has a generally C-shaped configuration including an arcuate central portion 152 and linear end portions 154 and 156. One end portion 154 of the guide member 150 is connected with the container 12b. The other end portion 156 of the guide member 150 is connected with a portion of the vehicle instrument panel shown schematically at 18b.

FIG. 7 illustrates the parts of the module 10b in an initial position similar to that of the module 10 shown in FIG. 1. The guide member 150 (FIG. 7) is in an undeformed condition. Upon actuation of the inflator (not shown) of the module 10b, the reaction force on the container causes the back wall 32b of the container 12b to move in the inward direction "I" toward the instrument panel portion 18b. The force of the moving container wall 32b is transmitted into the guide member 150. The guide member 150 moves from the condition shown in FIG. 7 to the condition shown in FIG. 8. As this movement occurs, the central portion 152 of the guide member 150 deforms, absorbing energy and slowing the movement of the container 12b. The guide assembly 100b thus controls or damps the inward movement of the container 12b.

Figure 9:
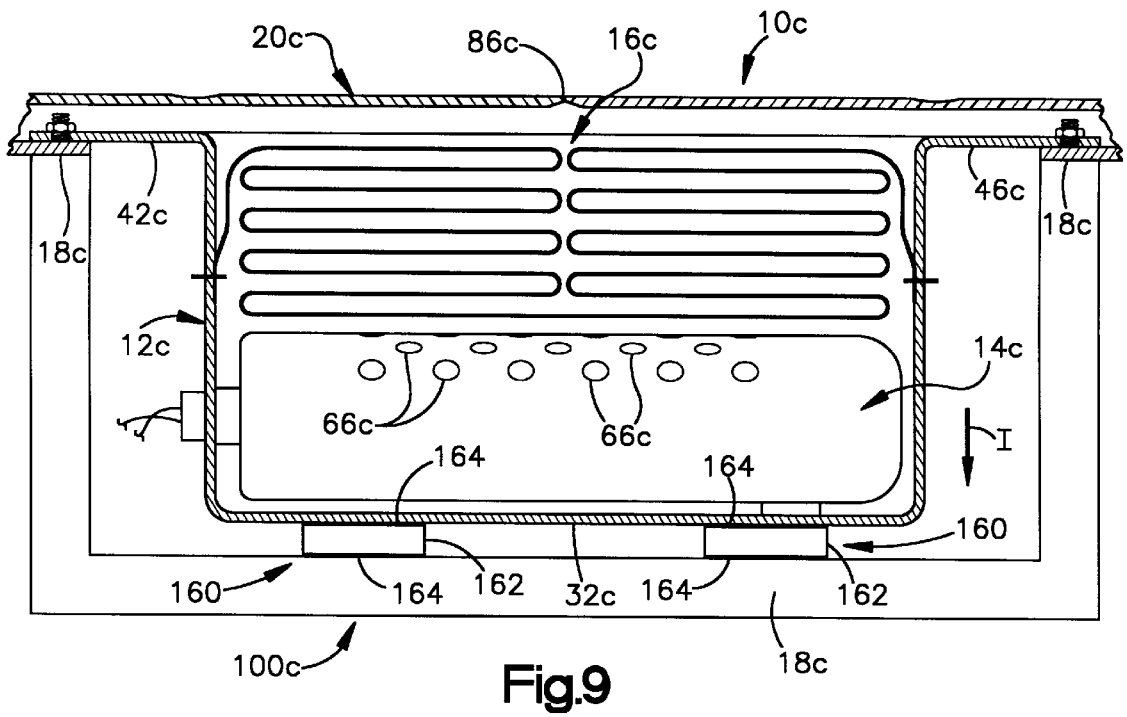
FIG. 9 is a view of a portion of an air bag module constructed in accordance with a fourth embodiment of the present invention, shown in a first condition.
Figure 10:
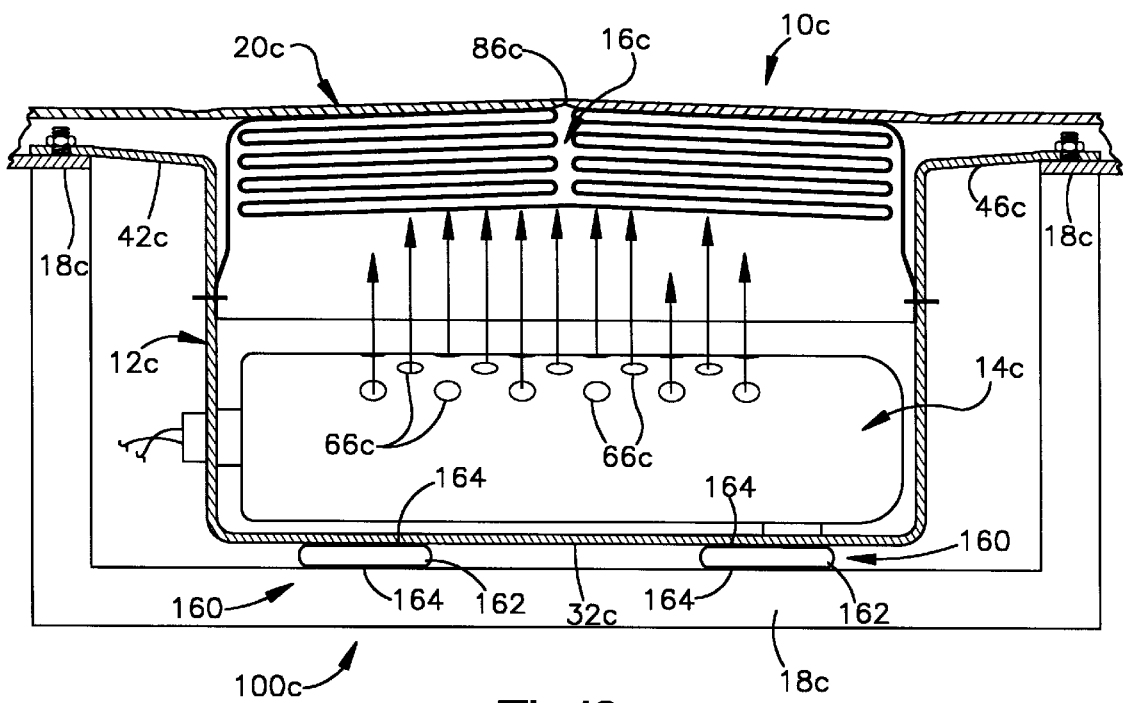
FIG. 10 is a view of the air bag module of FIG. 9 shown in a second condition.

FIGS. 9 and 10 illustrate a portion of an air bag module 10c constructed in accordance with a fourth embodiment of the present invention. The air bag module 10c is similar to the air bag module 10 (FIGS. 1–4). Parts of the module 10c which are the same as or similar to corresponding parts of the module 10 are given the same reference numerals with the suffix "c" added for clarity.

The air bag module 10c (FIG. 9) includes a damping mechanism or control mechanism 100c for controlling movement of the container 12c, relative to the instrument panel 18c, in the direction "I". The damping mechanism 100c includes a pair of identical guide members or damping members 160 which are connected between the back wall 32c of the container 12c and a portion of the instrument panel 18c. Each one of the guide members includes a viscoelastic pad 162.

Each viscoelastic pad 162 is made of a foam material secured by layers of adhesive 164 to the back wall 32c of the container 12c and to the instrument panel portion 18c, respectively. The pads 162 are preferably an engineered foam product such as a urethane, vinyl, or acrylic foam available from 3M Corporation of St. Paul, Minn. Specific preferred materials include 3M SJ 2502A urethane foam, SJ 2503 vinyl foam, and SJ 2505 and SJ 2506 acrylic foams. These foam materials are available with adhesive on both sides and a release strip for application.

FIG. 9 illustrates the parts of the module 10c in an initial position similar to that shown in FIG. 1. The pads 162 are in a relatively uncompressed or undeformed condition. Upon actuation of the inflator (not shown) of the module 10c, the reaction force on the container causes the back wall 32c of the container 12c to move in the inward direction "I" toward the instrument panel portion 18c. The force of the moving container wall 32c is transmitted into the pads 162. The pads 162 compress and move from the condition shown in FIG. 9 to the condition shown in FIG. 10. As the pads 162 compress, they convert much of the energy of movement of the container 12c to heat. The remaining energy is stored and, subsequently, released through a spring back action. The damping mechanism 100c thus controls or damps the inward movement of the container 12c.

Figure 11:
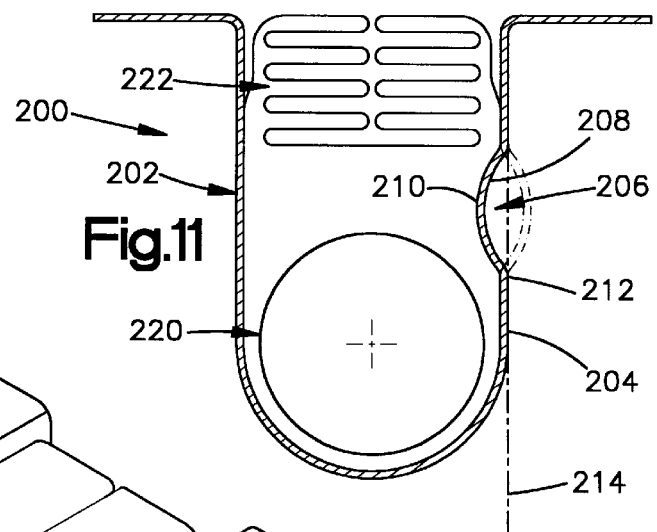
FIG. 11 is a schematic illustration of parts of an air bag module constructed in accordance with a fifth embodiment of the present invention.

FIG. 11 illustrates an air bag module 200 constructed in accordance with a fourth embodiment of the present invention. The air bag module 200 includes a container 202 having one or more predetermined weakened areas for relieving excess force on the container in the form of fluid pressure, in a manner described below. Specifically, a generally planar side wall 204 of the container 202 includes a deformable portion 206 which is a spherical segment of the side wall. When viewed in plan (from the right as viewed in FIG. 11), the deformable portion 206 has a circular configuration. The deformable portion 206 has an outer side surface 208 and an inner side surface 210.

The side wall 204 of the container 202 can flex or bend at the circular outer periphery 212 of the deformable portion 206 to allow the deformable portion to move in an over-center manner as described below, between the condition shown in solid lines in FIG. 11 and the condition shown in dot-dash lines in FIG. 11. The container 202 is manufactured so that, when the pressure on the inner surface 210 of the deformable portion 206 is less than or equal to a predetermined pressure, the deformable portion of the container is in the condition shown in solid lines in FIG. 11. That is, the deformable portion 206 is disposed inside (as viewed in FIG. 11) a reference plane 214 which is coplanar with the side wall 204 of the container 202. The deformable portion 206 is bowed inward from the plane reference plane 214 of the side wall 204 of the container 202, in a direction toward the inflator 220 and the air bag 222.

The characteristics of the container 202 are selected so that the deformable portion 206 moves from the condition shown in solid lines in FIG. 11 to the condition shown in dot-dash lines in FIG. 11 only when the pressure on the inner surface 210 of the deformable portion is equal to or exceeds the predetermined pressure. These characteristics include the material from which the container 202 is made, the thickness of the side wall 204 of the container, and the configuration of the deformable portion 206. The predetermined pressure is selected to be low enough so that the force of inflation fluid in the container 202 at the predetermined pressure does not damage the container or to the instrument panel (not shown) to which the module 200 is attached.

Upon actuation of the inflator 220, the fluid pressure in the container 202 increases rapidly. If the pressure of the inflation fluid in the container 202 reaches the predetermined pressure, the side wall 204 of the container flexes at the peripheral edge 212 of the deformable portion 206. The deformable portion 206 moves in an over-center manner, against its preset bias, from the condition shown in solid lines in FIG. 11 to the condition shown in dot-dash lines in FIG. 11. The deformable portion 206 moves or pops outward from the plane of the side wall 204 of the container 202, that is, in a direction away from the inflator 220. The deformable portion 206 in this condition is disposed outward of the reference plane 214.

When the deformable portion 206 of the container 202 moves outward in this manner, the volume of the container 202 increases. The increase in volume causes a corresponding decrease in the pressure in the container 202. The decrease in the pressure in the container 202 lowers the amount of force on the container to help reduce the possibility of damage to the container, or to the instrument panel.

Figure 12:
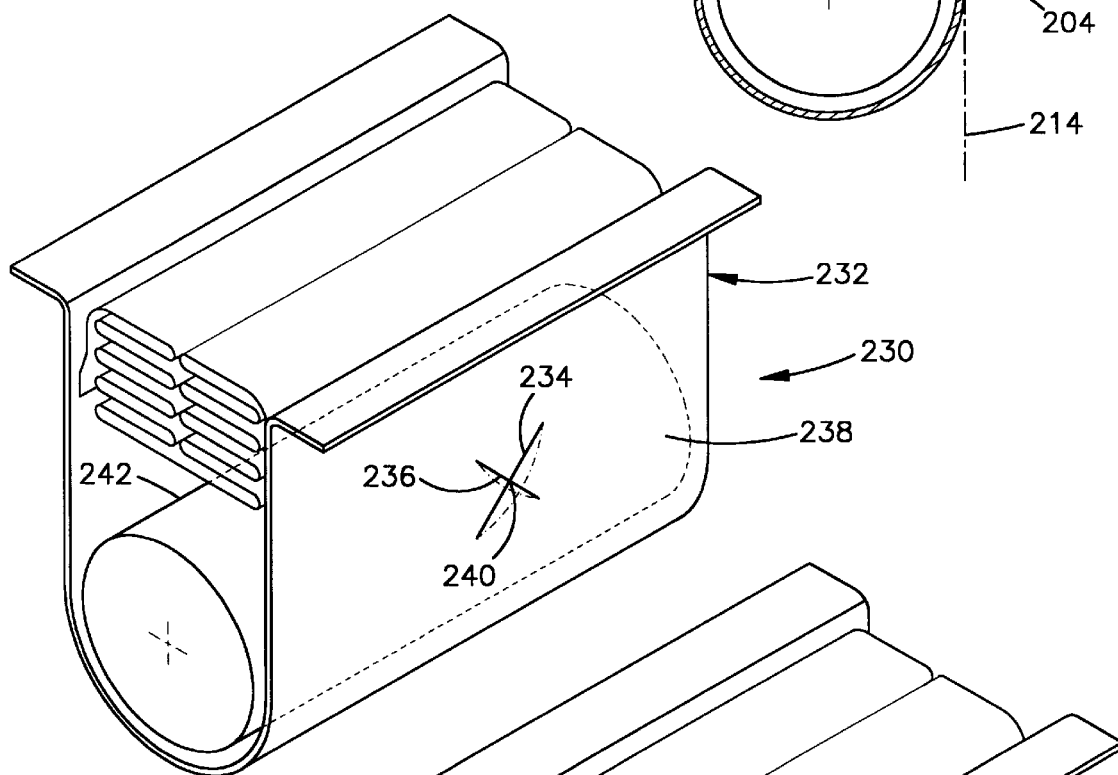
FIG. 12 is a schematic illustration of parts of an air bag module constructed in accordance with a sixth embodiment of the present invention.

FIG. 12 illustrates portions of an air bag module 230 constructed in accordance with a fifth embodiment of the present invention. The air bag module 230 includes a container 232 having a side wall 238. A pair of score lines 234 and 236 are formed in the side wall 238 of the container 232. The score lines 234 and 236 extend partially but not completely through the material of the side wall 238 of the container 232. The score lines 234 and 236 intersect at a point designated to form an X-shaped pattern 240. The score lines 234 and 236 weaken the side wall 238 of the container 232 in a predetermined manner.

If the pressure of the inflation fluid in the container 232 reaches a predetermined pressure, the side wall 238 of the container flexes at the score lines 234 and 236. The side wall 238 bulges outwardly from the condition shown in solid lines in FIG. 13 to the condition shown in dot-dash lines in FIG. 13, that is, in a direction away from the inflator 242. When the deformable side wall 238 of the container 232 moves outward in this manner, the volume of the container increases, causing a corresponding decrease in the pressure in the container. The decrease in the pressure in the container 232 can reduce the possibility of damage to the container, or to the instrument panel to which the module 230 is attached, caused by excessive force on the container.

Figure 13:
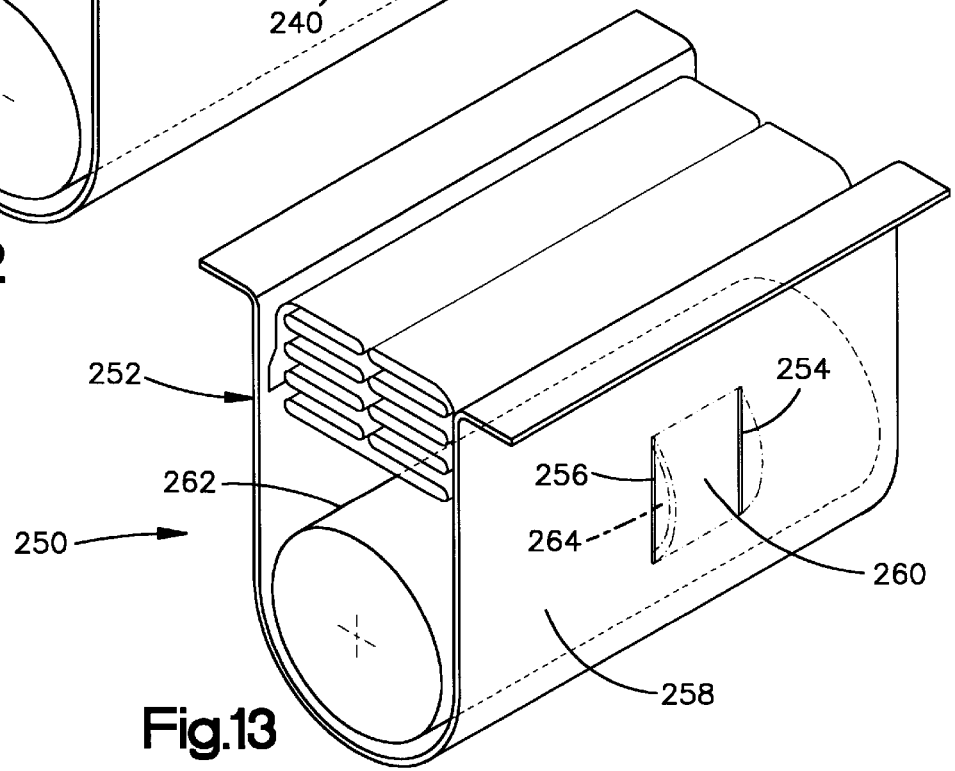
FIG. 13 is a schematic illustration of parts of an air bag module constructed in accordance with a seventh embodiment of the present invention.

FIG. 13 illustrates an air bag module 250 constructed in accordance with a sixth embodiment of the present invention. The air bag module 250 includes a container 252 having a side wall 258. A pair of score lines 254 and 256 are formed in the side wall 258 of the container 252. The score lines 254 and 256 extend parallel to each other and define a generally rectangular portion 260 of the side wall 258 of the container 252. The score lines 254 and 256 weaken the side wall 258 of the container 252 in a predetermined manner.

If the pressure of the inflation fluid in the container 252 reaches a predetermined pressure, the side wall 258 of the container 252 flexes at the score lines 254 and 256. The deformable portion 260 of the side wall 258, between the score lines 254 and 256, bulges outwardly from the condition shown in solid lines in FIG. 12 to the condition shown in dot-dash lines in FIG. 12, that is, in a direction away from the inflator 262. When the deformable side wall 258 of the container 252 moves outward in this manner, an opening 264 may be formed in the side wall of the container, causing a corresponding decrease in the pressure in the container. The decrease in the pressure in the container 252 can reduce the possibility of damage to the container, or to the instrument panel to which the module 250 is attached, caused by excessive force on the container.

From the above description of the invention, those skilled in the art will perceive improvements, changes and modifications in the invention. Such improvements, changes and modifications within the skill of the art are intended to be covered by the appended claims.

Having described the invention, we claim:

1. An apparatus for helping to protect an occupant of a vehicle, said apparatus comprising:

a container;

an inflatable vehicle occupant protection device connected with said container for helping to protect the occupant of the vehicle;

an inflator connected with said container for, upon actuation, providing inflation fluid to inflate said inflatable device;

means for supporting said container on a portion of the vehicle for movement in a first direction relative to the instrument panel in response to actuation of said inflator; and damping means connected between said container and the vehicle portion for damping movement of said container in the first direction relative to the vehicle portion.

2. An apparatus as set forth in claim 1 wherein the flow of inflation fluid from said inflator causes a reaction force urging said container to move in the first direction, said damping means blocking movement of said container in the first direction relative to the vehicle portion when the reaction force has a magnitude less than a predetermined amount, said damping means enabling movement of said container in the first direction relative to the vehicle portion when the reaction force has a magnitude greater than the predetermined amount.

3. An apparatus as set forth in claim 2 wherein said damping means comprises a first member which deforms to control movement of said container in the first direction relative to the vehicle portion when the reaction force has a magnitude greater than the predetermined amount.

4. An apparatus as set forth in claim 3 wherein said first member has a slot in which a second member is received, said second member moving in said slot and deforming said first member when the reaction force has a magnitude greater than the predetermined amount.

5. An apparatus as set forth in claim 3 wherein said container is made from metal and said first member is a portion of said metal container.

6. An apparatus as set forth in claim 3 wherein said first member is a viscoelastic pad.

7. An apparatus as set forth in claim 1 wherein said means for supporting said container on the vehicle portion comprises a portion of said container which is selectively deformable under load to enable a controlled amount of movement of said container relative to the vehicle portion.

8. An apparatus as set forth in claim 1 wherein said damping means comprises a viscoelastic pad connected in a force-transmitting relationship between said container and the vehicle portion.

9. An apparatus as set forth in claim 8 wherein said viscoelastic pad is made from a material selected from the group consisting of urethane foam, vinyl foam, and acrylic foam.

10. An apparatus for helping to protect an occupant of a vehicle, said apparatus comprising:

a container;

an inflatable vehicle occupant protection device connected with said container for helping to protect the occupant of the vehicle;

an inflator connected with said container for, upon actuation, providing inflation fluid to inflate said inflatable device;

means for supporting said container on a portion of the vehicle for movement in a first direction relative to the vehicle portion in response to actuation of said inflator;

a first member connected with one of said container and vehicle portion, said first member including surface means for defining a slot extending in a direction generally parallel to the direction of movement of said container upon actuation of said inflator; and a second member connected with the other one of said container and vehicle portion, said second member being at least partially disposed in said slot in said first member, said first member deforming upon movement of said second member in said slot in response to movement of said container in the first direction relative to the vehicle portion.

11. An apparatus as set forth in claim 10 wherein said slot has a first end portion, a second end portion, and a narrow portion intermediate said first and second end portions, said second member being at least partially disposed in said first end portion of said slot prior to actuation of said inflator, said second member being movable along said slot past said narrow portion of said slot in a direction toward said second end portion of said slot upon movement of said container in the first direction relative to the vehicle portion.

12. An apparatus as set forth in claim 10 wherein the flow of inflation fluid from said inflator causes a reaction force urging said container to move in the first direction relative to the vehicle portion, said first and second members cooperating to damp said movement of said container in the first direction relative to the vehicle portion.

13. An apparatus as set forth in claim 12 wherein said first guide member is deformable in response to movement of said container in the first direction.

14. An apparatus as set forth in claim 10 wherein said second member is on said container and said first member is on the vehicle portion.

15. An apparatus as set forth in claim 10 wherein said first member is on said container and said second member is on the vehicle portion.

16. An apparatus for helping to protect an occupant of a vehicle, said apparatus comprising:

a container;

an inflatable vehicle occupant protection device connected with said container for helping to protect the occupant of the vehicle;

an inflator connected with said container for, upon actuation, providing inflation fluid to inflate said inflatable device;

means for supporting said container on the vehicle for movement relative to the vehicle in a first direction opposite the direction of inflation of said inflatable device in response to actuation of said inflator; and damping means connected between said container and the vehicle for damping movement of said container in the first direction relative to the vehicle.

17. An apparatus as set forth in claim 16 wherein the flow of inflation fluid from said inflator causes a reaction force urging said container to move in the first direction, said damping means blocking movement of said container in the first direction relative to the vehicle when the reaction force has a magnitude less than a predetermined amount, said damping means enabling movement of said container in the first direction relative to the vehicle when the reaction force has a magnitude greater than the predetermined amount.

18. An apparatus as set forth in claim 17 wherein said damping means comprises a first member which deforms to control movement of said container in the first direction relative to the vehicle when the reaction force has a magnitude greater than the predetermined amount.

19. An apparatus as set forth in claim 18 wherein said first member has a slot in which a second member is received, said second member moving in said slot and deforming said first member when the reaction force has a magnitude greater than the predetermined amount.

20. An apparatus as set forth in claim 18 wherein said first member is a viscoelastic pad.

21. An apparatus as set forth in claim 16 wherein said means for supporting said container on the vehicle comprises a portion of said container which is selectively deformable under load to enable a controlled amount of movement of said container relative to the vehicle.

* * * * *